Patented Apr. 8, 1947

2,418,660

UNITED STATES PATENT OFFICE

2,418,660

MANUFACTURE OF REGENERATED CELLULOSE STRUCTURES

Marion Thomas O'Shaughnessy, Jr., Bethesda, Md., assignor to E. I. du Pont de Nemours & Company, Wilmington, Del., a corporation of Delaware No Drawing. Application April 24, 1943, Serial No. 484,491

6 Claims. (Cl. 18—57)

This invention relates to the manufacture of regenerated cellulose structures and particularly to a method of purification of regenerated cellulose structures, and especially to a method of desulfuring regenerated cellulose structures.

For convenience, the invention will be discussed in terms of regenerated cellulose film. In accordance with the well-known procedure, regenerated cellulose film is made by extruding viscose, a caustic solution or dispersion of sodium cellulose xanthate, through an elongated extrusion orifice into a bath containing acid and inorganic salts which serve to coagulate the sodium cellulose xanthate and regenerate the same into cellulose in the form of a continuous self-sustaining film. Thereafter, the regenerated cellulose film is washed and treated by several solutions which complete the purification process and render the film suitable for commercial use.

The most frequent source of difficulty generally encountered in cellulose film purification arises because of the sulfur present in the cellulose xanthate. In regenerated cellulose, sulfur exists in several different forms or states of oxidation. Of these, sulfur existing as sulfates is the most stable form but its presence in small amounts in the finished film is usually not objectionable. In addition to sulfates, however, sulfur is also present in regenerated cellulose in the free state as elementary sulfur, and in other forms of combination, chiefly sulfides. The most commonly occurring sulfides found in regenerated cellulose film are carbon bisulfide and hydrogen sulfide, both of which may exist in the gaseous phase but they may also be present as materials which are potential sources of these. Metallic sulfides may be present also. For convenience, the combined forms of sulfur other than sulfates will be referred to hereinafter as "sulfide sulfur."

The presence of sulfide sulfur in regenerated cellulose film is highly objectionable because of the undesirable color and odor which it imparts to the film. It is well known in the art, for example, that the presence of a very small amount of sulfide sulfur in regenerated cellulose film may make the film unsuitable for many critical purposes, such as the packaging and storing of foodstuffs or other perishable commodities or as containers for the packaging and display of confectionery, silverware, and many similar uses. For this reason, the purification process must provide for its elimination or its reduction to a minimum content.

In prior art practice, film purification was accomplished, after regenerating the cellulose in the usual manner, by washing the film with hot water, whereby the greater part of the sulfide sulfur, chiefly carbon bisulfide and hydrogen sulfide, was removed. Elementary or free sulfur, however, remained in the film and its removal was accomplished by the use of an alkaline bath of metallic sulfide, preferably sodium sulfide. Thereafter, the film was washed in water, bleached, washed and, if desired, impregnated with a softener. The oxidizing action of the bleach also served to further reduce the sulfide sulfur remaining in the film. Cellulose film prepared by this method, however, often retained so much sulfide sulfur that when the film was stored in a confined space or when stored in a warm place for a short period, it became unsuitable for many critical uses because of offensive odors arising from the residual sulfide sulfur and because of undesirable color imparted to the film. In the prior art manufacturing process, it was very difficult to produce in a continuous method a cellulose film free from objectionable color or odor for the reason that the prior art methods of film purification did not provide for the effective removal of small amounts of sulfide sulfur, and consequently the resulting film did not contain a dependably low and uniform sulfide sulfur content.

In attempting to overcome these difficulties, many variations of prior art practice have been attempted. These have consisted mainly in varying the temperature and concentration of the regenerating bath solutions and increasing the temperature of the wash solutions preceding desulfuring with sodium sulfide. Desulfurants other than sodium sulfide have been used. There has been attempted also the use of various bleaching agents as well as an increased concentration of the sodium hypochlorite which is usually employed. In most instances, the suggested remedies were not economical and too frequently resulted in degradation of the cellulose film. None of the attempts in overcoming prior art difficulties has succeeded in producing film, at high speed, of dependably low or uniform sulfide sulfur content and of quality suitable for the critical uses aforementioned.

It is an object of this invention to provide a rapid, continuous method for purifying regenerated cellulose film whereby the sulfide sulfur is reduced to a minimum and substantially constant amount.

It is also an object of this invention to provide a regenerated cellulose film substantially free from sulfide sulfur and eminently suited for uses where such sulfur is objectionable as a source of odor or a health hazard, as in the wrapping or packaging of foodstuffs or other perishable commodities, or as a source of tarnishing, as in the packaging of metal objects.

The objects of this invention are accomplished, in general, by desulfuring with sodium sulfide in the usual manner, washing the regenerated cellulose film with hot water, and then subjecting the film to the additional action of hot, dilute mineral acid, preferably 0.2% sulfuric acid, again washing with hot water, and thereafter employing the usual operations of bleaching, washing with water and, if desired, plasticizing or softening. Regenerated cellulose film so prepared contains less than 0.0070% of carbon bisulfide sulfur and less than 0.0030% of inorganic non-sulfate sulfur, the total amount of sulfide sulfur being less than 0.010%, and is substantially free from objectionable color or odor arising therefrom.

In the following examples, which illustrate several specific embodiments of the invention, there is included the sulfide sulfur content of the finished film as measured by the following method:

A sample of film weighing from 14 to 21 grams is placed in a 500 ml. wide mouth Erlenmeyer flask containing sufficient glass beads to completely cover the bottom of the flask. The flask is closed with a desulfurized rubber stopper carrying (1) a separatory funnel, (2) a sintered glass gas distributor tube connected by means of a Hopkins spray trap to a gas absorption train. The absorption train consists of (1) a cadmium hydroxide trap containing additionally a large excess of sodium hydroxide and (2) two alcoholic potash traps connected in series after the cadmium hydroxide trap.

To start the analysis, 160 ml. of water are added to the flask through the separatory funnel (this may be added before the flask is connected into the system) and the analysis train is swept out with a stream of nitrogen for about 5 minutes with a nitrogen flow rate of from 1.6 to 2.0 cubic feet per hour. Eighty ml. of 12 n. hydrochloric acid are cautiously added by means of the separatory funnel and the contents of the flask heated to boiling on a hot plate and boiled for 45 minutes. A nitrogen flow of from 1.6 to 2.0 cubic feet per hour is maintained through the analysis train during this period.

At the end of the 45-minute digestion period, the film should be practically entirely decomposed. The nitrogen flow is cut off and the flask allowed to cool slightly while ½ ml. of 2 n. caustic is added to the cadmium hydroxide trap. The stopper is then removed from the digestion flask and 1.0 gram of aluminum foil is added. After quickly replacing the stopper, the system is swept out with nitrogen at the same flow rate as before, and the contents of the digestion flask are again boiled until all of the aluminum has dissolved. Heating is discontinued, 100 ml. of water are added to the digestion flask through the separatory funnel while the sweeping with nitrogen is continued for five minutes.

To the contents of the cadmium hydroxide trap an excess of hydrochloric acid is added and the liberated hydrogen sulfide is measured by titration with a standard iodine solution, according to the well-known procedure. The results are calculated as sulfur (S) and represent the inorganic non-sulfate sulfur.

The contents of the two alcoholic potash traps are combined and the sulfur determined as above. The results are calculated as sulfur (S) and represent $CS_2$ sulfur.

EXAMPLE

A regenerated cellulose film is cast from viscose in the conventional manner at a speed of 50 meters per minute and, after washing with water to remove most or all of the regenerating bath acids and salts and most of the sulfur in the form of volatile compounds, is passed through a bath containing sufficient sodium sulfide to produce an alkalinity of 0.2%, calculated as NaOH, at a temperature of 90° C. After leaving the bath, the film is washed with a countercurrent flow of water at a temperature of 90° C. It is then passed through an aqueous solution containing 0.2% sulfuric acid at a temperature of 90° C.

Upon removal from this bath, the film is washed with water at a temperature of 35° C., bleached with a solution of sodium hypochlorite containing 0.14% available chlorine, washed, impregnated with glycerine, and dried in the usual manner. The film so produced contains, upon analysis, 0.0053% sulfide sulfur (0.0042% carbon bisulfide sulfur and 0.0011% inorganic non-sulfate sulfur).

A similar film prepared in all respects as the above, except that the treatment with hot, dilute sulfuric acid is omitted, is found, upon analysis, to contain 0.0140% sulfide sulfur (0.0080% carbon bisulfide sulfur and 0.0060% inorganic non-sulfate sulfur).

The two films prepared according to these specifications are stored for one week in the form of closely wrapped rolls. The former is found to be completely free from sulfurous odor and the latter possesses detectable sulfurous odor.

For convenience, the results of Example I and those that follow are tabulated below. In all cases, following initial washing of the regenerated films with water, treatment is given with a sodium sulfide solution of an alkalinity of 0.2%, calculated as NaOH, at a temperature of 90° C. Since this treatment is common to all the films and precedes the water wash shown in column 3, it is not shown in the table.

The table indicates how variables, such as film speed, temperature of water washes, etc., are modified to show the effect of the hot, dilute acid treatment, when given, following the usual desulfuring with sodium sulfide.

Table

| Example | Casting Speed Meters Per Min. | Water Wash Temp. | Treatment with 0.2% $H_2SO_4$ Temp. | Water Wash Temp. | NaClO Bleach Avail. Chlorine | $CS_2$ Sulfur in Final Film | Inorganic Non-sulfate Sulfur in Final Film | Total Sulfide Sulfur | Odor—Development Package Test |
|---|---|---|---|---|---|---|---|---|---|
| | | °C. | °C. | °C. | Percent | Percent | Percent | Percent | |
| I | 50 | 90 | 90 | 35 | 0.14 | 0.0042 | 0.0011 | 0.0053 | No $CS_2$ odor after one week. |
| IA | 50 | 90 | | 35 | 0.14 | .0080 | 0.0060 | 0.0140 | $CS_2$ detected after one week. |
| II | 50 | 90 | 90 | 35 | 0.05 | 0.0050 | 0.0035 | 0.0085 | No $CS_2$ odor after one week. |
| IIA | 50 | 90 | | 35 | 0.10 | 0.010 | 0.0070 | 0.0170 | Appreciable $CS_2$ odor after one week. |
| IIB | 50 | 35 | | 35 | 0.10 | 0.010 | 0.0060 | 0.0160 | Appreciable $CS_2$ odor after one week. |
| III | 70 | 35 | 90 | 35 | 0.06 | 0.0055 | 0.0040 | 0.0095 | No $CS_2$ odor after one week. |
| IIIA | 70 | 35 | | 35 | 0.06 | 0.020 | 0.0150 | 0.0350 | Strong $CS_2$ odor after several hours. |
| IIIB | 70 | 35 | | 35 | 0.16 | 0.013 | 0.0110 | 0.0240 | Marked disagreeable $CS_2$ odor after one week. |
| IV | 94 | 90 | 90 | 35 | 0.11 | 0.005 | 0.0036 | 0.0086 | No $CS_2$ odor. |
| IVA | 94 | 90 | | 35 | 0.16 | 0.015 | 0.0120 | 0.0270 | Strong $CS_2$ odor in a few hours. |

With further reference to the table, it will be seen that in Example II. film is cast at the same speed as in Example I but a milder bleach is used. In modifications IIA and IIB, the hot, dilute acid treatment is omitted. Even with increased concentration of the bleaching solution, it is observed that sulfide odor develops in a short time while the acid treatment produces film free from sulfide odor.

In Example III, the film speed is increased and an attempt is made, as noted in IIIA, to omit the acid treatment, wash with water instead, and employ the mild bleach used in III. The film, however, develops a strong sulfide odor after only a few hours' storage. In IIIB, it is noted that even increasing the bleach concentration over 100% does not improve sulfide odor in the film.

In a modification of Example IIIB, not shown in Table I, the bleach concentration is increased to 0.48%. The higher concentration, however, is ineffective in reducing the sulfide sulfur content over that accomplished by a concentration of 0.16%.

In Example IV, the film speed is increased to 94 meters per minute. It is found desirable to increase somewhat the bleach concentration over that employed at lower speeds. It is noted, however, as in IVA, that when the hot acid treatment is omitted, even the use of a stronger bleach does not produce film of acceptable sulfide sulfur content.

It will be noted that the preferred embodiment of the invention involves the combined operations of treating with hot, dilute acid, following desulfuring with alkali metal sulfide and before the bleaching process. It has been surprisingly observed that the action of the hot acid subsequent to alkali sulfide treatment is very rapid and complete and permits more effective bleaching action subsequently. It is believed that the metallic sulfide so modifies the internal structure of the film, as by swelling, collapsing of internal voids, etc., that it makes possible the effective removal of the greater part of the sulfide sulfur by the hot acid and thus permits the substantial elimination of the residue in the remaining steps of washing, bleaching, etc.

As the examples indicate, the invention is markedly superior at the higher casting speeds. At the more conventional casting speeds, that is, 50 meters per minute or less, its chief advantage, in comparison with the standard procedure, is noticeable when used in combination with the minimum bleach concentration required for a film of satisfactory quality.

In the examples wherein the casting speed is 50 meters per minute, the period of contact of the film with the hot acid may vary from approximately 2 seconds for a single pass through the hot acid solution to approximately 12 seconds in case four passes are made. With other casting speeds, the periods of contact would vary accordingly.

While the preferred embodiment of this invention specifies the use of sulfuric acid for the hot acid treatment following desulfuring with sodium sulfide, it is understood that the invention is not limited to its exclusive use, as other non-oxidizing acids, i. e. acids which under the conditions of use will not exert any oxidizing action on the cellulose, such as hydrochloric or phosphoric, may also be used. Nor is the invention necessarily limited to the specific concentration of 0.2%, but it is also effective with concentrations as low as 0.05% or as high as 1.0% without causing degradation of the film.

It is also understood that, while the acid treatment is preferably employed at a temperature of 90° C., other temperatures may be used with satisfactory results, depending, of course, on the thickness of film and the length of time it is submitted to the action of the hot bath. Thus, it has been found that temperatures as low as 80° C. or as high as 100° C. may be used without impairing the quality of the film.

While sodium sulfide is the preferred desulfuring agent, it is understood that the invention is not limited to its use exclusively, as potassium sulfide, ammonium sulfide or sulfides of the alkaline earth metals may be used effectively. Sodium sulfite, potassium sulfite or the thiosulfates of these metals may also be used for this purpose, although, for economic and other reasons, the use of sodium sulfide is preferred.

For convenience, a bleach solution of a sodium hypochlorite has been specified in describing the invention, but it is understood that the operations are not necessarily limited to its use as bleach solutions of other alkali metals as well as of the alkaline earth metals may also be used. Aqueous solutions of hydrogen peroxide, alkali metal perborates and alkali metal percarbonates as well as alkali metal chlorites may be used, but for economic and other reasons are not the preferred embodiment of this invention.

In the case of sodium hypochlorite bleach, experience has taught that the concentration of the available chlorine may range from about 0.04% to 0.16%. Lower concentrations are ineffective and concentrations higher than the upper limit frequently result in degradation of the cellulose film.

While for convenience the invention has been described in terms of the manufacture of regenerated cellulose films, it is understood that the method may be used also for the substantially complete desulfuring of other regenerated cellulose structures, such as threads, filaments, shrinkable caps, monofils and other forms, as it is not limited to the shape of the articles but is satisfactory for the purification of various forms of regenerated cellulose.

The invention possesses numerous inherent economic advantages. Thus, it is possible by the combination of purification operations herein described to achieve substantially complete elimination of sulfide sulfur in regenerated cellulose film and the production of film eminently suited for uses where the sulfur content is a high criterion of quality. Moreover, by employing milder bleach solutions than has been possible heretofore, there results considerable savings in raw materials, particularly chlorine. The invention also makes possible for the first time the production of film, having low sulfide sulfur content, at high speeds with no impairment of its quality.

Since it is obvious that various changes and modifications may be made in the above description without departing from the nature or spirit thereof, this invention is not restricted thereto except as set forth in the appended claims.

I claim:

1. In the manufacture of regenerated cellulose structures by the viscose process wherein the regenerated cellulose structure while in the gel state is desulfured with a desulfuring agent selected from the class which consists of sodium sulfide, potassium sulfide, ammonium sulfide, alkaline earth metal sulfide, sodium sulfite, potassium sulfite, sodium thiosulfate and potassium thiosulfate and thereafter washed and bleached, the step which comprises treating the regenerated cellulose structure subsequent to the washing after desulfuring and prior to bleaching with a mineral acid of a concentration of from 0.05% to 1.0% and at a temperature of from 80° C. to 100° C. to remove a substantial amount of the sulfide sulfur from the structure.

2. In the manufacture of regenerated cellulose structures by the viscose process wherein the regenerated cellulose structure while in the gel state is desulfured with a desulfuring agent selected from the class which consists of sodium sulfide, potassium sulfide, ammonium sulfide, alkaline earth metal sulfide, sodium sulfite, potassium sulfite, sodium thiosulfate and potassium thiosulfate and thereafter washed and bleached, the step which comprises treating the regenerated cellulose structure subsequent to the washing after desulfuring and prior to bleaching with 0.2% sulfuric acid at a temperature of 90° C. to remove a substantial amount of the sulfide sulfur from the structure.

3. A process of preparing regenerated cellulose film which comprises producing a gel regenerated cellulose film from viscose, washing said film, desulfuring said film with a desulfuring agent selected from the class which consists of sodium sulfide, potassium sulfide, ammonium sulfide, alkaline earth metal sulfide, sodium sulfite, potassium sulfite, sodium thiosulfate and potassium thiosulfate, washing said film, treating the washed desulfured film with a mineral acid of a concentration of from 0.05% to 1.0% and at a temperature of from 80° C. to 100° C. to remove a substantial amount of the sulfide sulfur from the film, washing said film, and thereafter bleaching said film.

4. A process of preparing regenerated cellulose film which comprises producing a gel regenerated cellulose film from viscose, washing said film, desulfuring said film with a desulfuring agent selected from the class which consists of sodium sulfide, potassium sulfide, ammonium sulfide, alkaline earth metal sulfide, sodium sulfite, potassium sulfite, sodium thiosulfate and potassium thiosulfate, washing said film, treating the washed desulfured film with sulfuric acid of a concentration of from 0.05% to 1.0% and at a temperature of from 80° C. to 100° C. to remove a substantial amount of the sulfide sulfur from the film, washing said film, and thereafter bleaching said film.

5. A process of preparing regenerated cellulose film which comprises producing a gel regenerated cellulose film from viscose, washing said film, desulfuring said film with a desulfuring agent selected from the class which consists of sodium sulfide, potassium sulfide, ammonium sulfide, alkaline earth metal sulfide, sodium sulfite, potassium sulfite, sodium thiosulfate and potassium thiosulfate, washing said film with water at a temperature of 90° C., treating the washed desulfured film with 0.2% sulfuric acid at a temperature of 90° C. to remove a substantial amount of the sulfide sulfur from the film, washing said film, and thereafter bleaching said film.

6. A process of preparing regenerated cellulose film which comprises producing a gel regenerated cellulose film from viscose, washing said film, treating said film with a sodium sulfide solution of an alkalinity of 0.2%, calculated as NaOH, and at a temperature of 90° C., washing said film with water at a temperature of 90° C., treating the resulting film with 0.2% sulfuric acid at a temperature of 90° C. to remove a substantial amount of the sulfide sulfur from the film, washing said film, and thereafter bleaching said film with a sodium hypochlorite bleach in which the available chlorine is from 0.04% to 0.16%.

MARION THOMAS O'SHAUGHNESSY, Jr.

REFERENCES CITED

The following references are of record in the file of this patent:

UNITED STATES PATENTS

| Number | Name | Date |
|---|---|---|
| 2,004,875 | Lilienfeld | June 11, 1935 |
| 2,004,876 | Lilienfeld | June 11, 1935 |
| 2,004,877 | Lilienfeld | June 11, 1935 |
| 1,117,604 | Reid | Nov. 17, 1914 |
| 1,915,072 | Richter et al. | June 20, 1933 |
| 2,208,965 | Dousma | July 23, 1940 |
| 2,194,470 | Hartmann et al. | Mar. 26, 1940 |
| 2,092,203 | Brennecke et al. | Sept. 7, 1937 |
| 2,066,371 | Stein | Jan. 5, 1937 |
| 2,345,622 | Mothwurf | Apr. 4, 1944 |

OTHER REFERENCES

Scherer, Studies on the Desulfurization of Crude Viscose Rayon. Rayon Textile Monthly. January, 1937, pp. 33-34.

Scherer, Studies on the Desulfurization of Crude Viscose Rayon. Rayon Textile Monthly. February, 1937, pp. 83-85.

Scherer, Studies on the Desulfurization of Crude Viscose Rayon. Jan. and Feb. 1937, pages 73 (33)—74 (34) and 39 (83)—41 (85) Rayon Textile Monthly.